April 14, 1953   C. B. MERRY   2,634,666
IMPROVED EARTHWORKING WHEEL
Original Filed April 25, 1949   2 SHEETS—SHEET 2

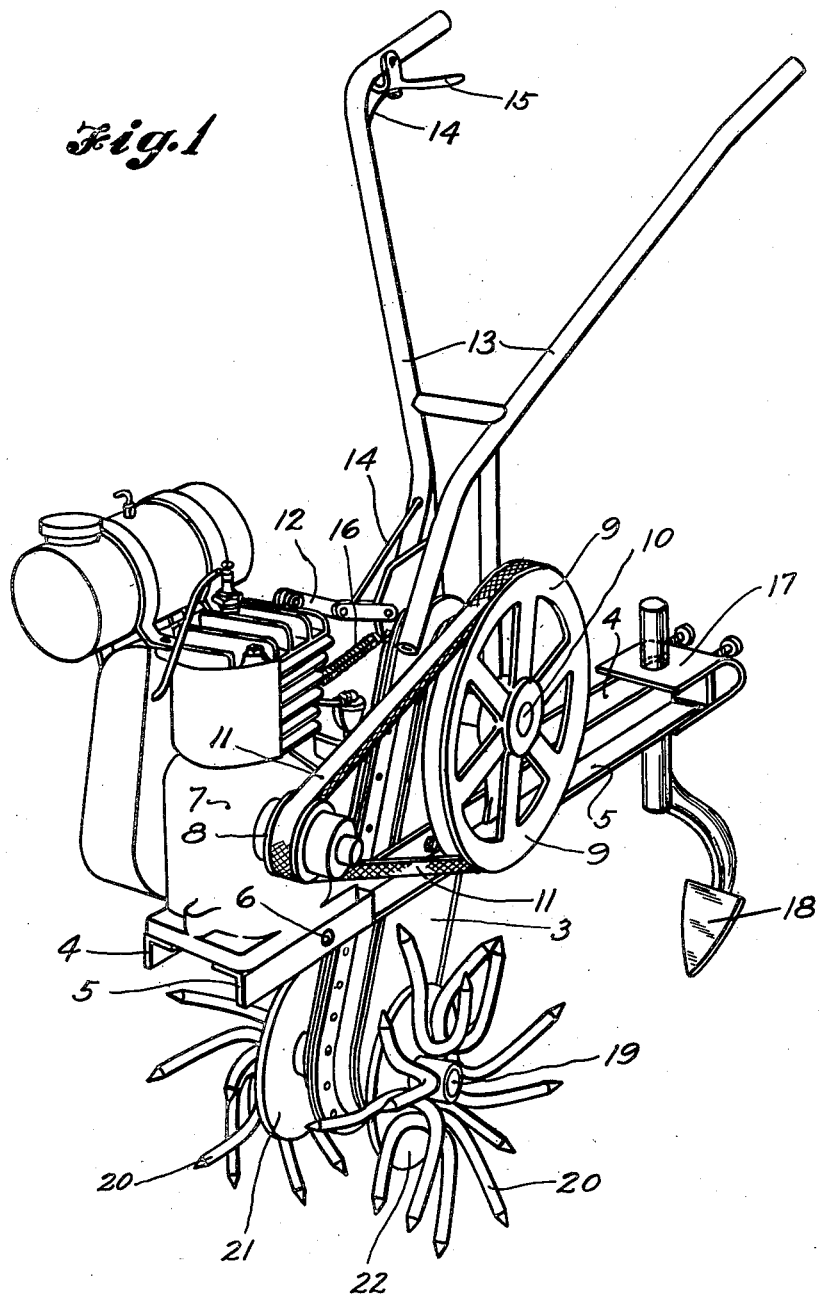

Inventor
Clayton B. Merry
By Barnes Reed
Attorneys

Patented Apr. 14, 1953

2,634,666

UNITED STATES PATENT OFFICE 2,634,666

IMPROVED EARTHWORKING WHEEL

Clayton B. Merry, Alderwood Manor, Wash.

Original application April 25, 1949, Serial No. 89,421. Divided and this application July 1, 1950, Serial No. 179,461

6 Claims. (Cl. 97—212)

The present invention relates to earthworking wheels and aims to provide a wheel which can be used on a walking cultivator for both tractive and tilling functions while supporting the weight thereof. This application is a division of my co-pending application, Serial No. 89,421, filed April 25, 1949, now Patent No. 2,614,474.

An important object of the present invention is to provide an earthworking wheel which can cultivate to a depth beyond its hub. More particularly stated, the invention strives to perfect a multiple-tined wheel which can till to a depth far exceeding the length of the tines, and in fact, to a depth greater than the diameter of the wheel if need be.

A further object is to provide such a wheel in which the parts may be secured together by welds only.

Still another object is to provide a tined wheel whose tines are highly resistant to fracture and yet which is of simple and light construction.

Other more and particular objects and advantages will, with the foregoing, appear and be understood in the course of the following description and claims, the invention consisting in the novel construction and combination of parts hereinafter described and claimed.

In the drawings:

Figure 1 is a perspective view of my walking powered cultivator.

Figures 2, 3:
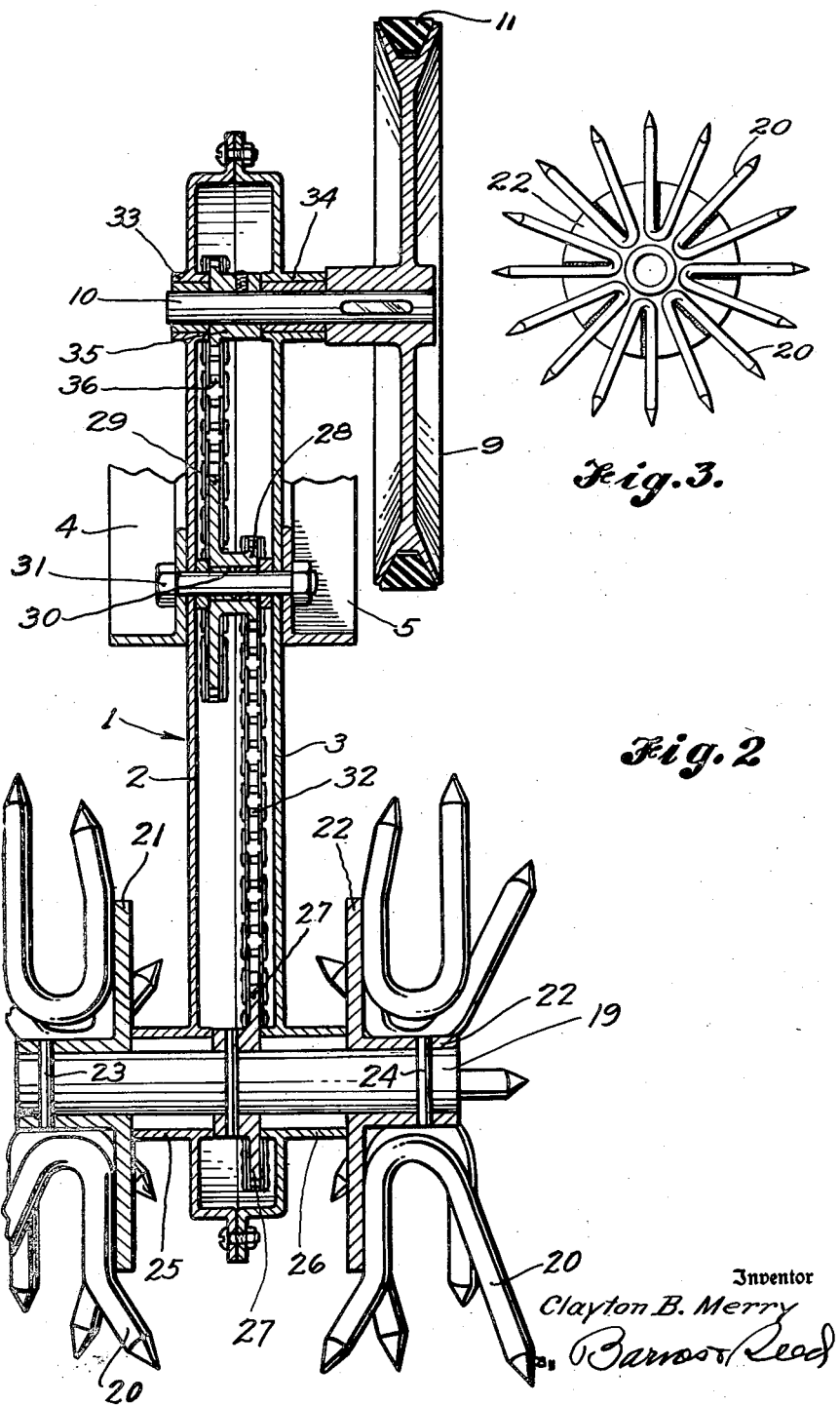
Figure 2 is a sectional view thru the sprocket centers of the transmission of the device shown in Figure 1.
Figure 3 is a side view of one of the earthworking wheels.

In Figure 1, the perspective view of my new cultivator, there is shown the transmission housing 1 which is made up of the two case halves 2, 3 presenting bosses 25, 26 at their lower end. Mounted on and forward of this case by means of the two angle irons 4, 5 and the motor pivot 6 is the motor 7. The motor 7 is a standard air cooled four cycle gasoline engine of about one and one-half horse power. The drive pulley 8 of the motor is V-belted to a driver pulley 9 mounted on a shaft 10 journaled in the upper part of the housing 1. The V-belt 11 is used not only for the transmission of power but, also, as a clutch by pivoting the motor base on the pivot 6. Control of the motor swing is had by the toggle link 12. This toggle link has one end secured to the motor head and the other end secured to the handles 13. A cable control 14 extends between the toggle link and a hand lever 15 mounted on the grip portion of one of the handles. Tension is placed across the toggle link by the spring 16. This spring pulls the motor toward the handles to declutch the motor when tension on the cable 14 is released. The handles 13 are of welded tubular construction and are bolted to the housing thru the flanges thereof. Secured to the rearward ends of the angles irons 4, 5 is a hitch 17 in which there may be demountably fastened a brake tooth 18 having a flat front face sloping forwardly somewhat and shaped so as to be easily urged into the ground.

As shown in Figure 2, there are suitable mechanisms in the case 1 to transmit power from the drive pulley 9 mounted on the drive shaft 10 in the upper part of the housing to the driven shaft 19 mounted in the lower part of the housing 1 and extending thru and beyond the bosses 25, 26 which carry suitable bearings and oil seals for the shaft. Detachably mounted on the ends of the shaft at both sides of the housing are the hubs 21, 22 of earthworking wheels each presenting a plurality of radially extending spike-like tines 20 along the length thereof. Pins 23, 24 extending through a respective hub and shaft lock the wheels to the shaft. The tines 20 are made from round bars each bent into a generally U-shaped unit whose legs serve as the tines and are preferably pointed somewhat at the free ends. The hubs 21, 22 are circumferentially flanged at their inner end with the flanges being purposely thin so as not to resist ground penetration. The U-shaped units each have one of their legs welded to the outer end face of the respective hub flange with the ends of the legs extending radially therebeyond. It will be noted that the plane defined by each unit is offset from the plane normal to the rotary axis of its hub so that the tines of each unit will follow different travel paths. Also of importance is the fact that the shape of each U-shaped unit may be varied from the others on the hub so that the tines of one unit do not track behind the respective tines of another, but in effect cover the whole width of the cultivator. For example, in the illustrated embodiment, as best shown in Figure 2, two shapes of U-shaped units are utilized, one having diverging tines and the other having its tines converging slightly. Of import is the fact that each of the welded diverging tines is bent over the peripheral edge of the respective hub flange so that its point extends past the inner face of the flange and tracks close to the drive housing, and that the other diverging tines track laterally beyond the outer ends of the hubs and the shaft 19.

Secured to and medially of the driven shaft 19 is a driven shaft sprocket 27. Medially of the housing 1 is an intermediate cone sprocket having a smaller sprocket 28 and a larger sprocket 29 secured together to form the cone sprocket. The cone sprocket turns on a sleeve 30. Washers space the ends of the sleeve from the case halves and take the end thrust of the cone sprocket. The washers and sleeve 30 are carried on a bolt 31 that passes thru the case halves and a flange of each of the motor support angles 4, 5. The bolt is tightened so that the housing halves 2, 3, washers and sleeve 30 are clamped together to prevent movement or turning of the sleeve and washers. A chain 32 is placed around and between the intermediate smaller sprocket 28 and the driven sprocket 27. An upper bearing boss 33, 34 is secured to each case half 2, 3 near its upper end. The drive shaft 10 is journaled in these upper bearing bosses. Outboard of the drive shaft 10 is the driven pulley 9. Inboard of drive shaft 10 is a drive sprocket 35 which is secured to the drive shaft 10. A chain 36 is placed around and between the drive sprocket 35 and the large intermediate sprocket 29.

The operation of the power transmission train is to obtain a speed reduction at each step from the motor, that is, from the motor drive pulley 8 to the driven pulley 9, from the drive sprocket 35 to the intermediate larger sprocket 29, from the intermediate smaller sprocket 28 to the driven sprocket 27. With a motor operating at about 2,400 R. P. M., the value of the train is best at about one to thirty. With a diameter of about ten inches for the assembly of the ground engaging teeth 20, the cultivator operates at a convenient walking speed.

For any given throttle setting the operator can control the amount of tillage performed by the rotating tines 20 by controlling the depth of the brake tooth 18 in the ground through downward pressure on the handles. If the earth is particularly hard or rocky the forward progress of the machine can be stopped altogether by the brake tooth in which case the tines will dig until the hubs are actually well beneath the ground level. This is possible because the housing 1 has a particularly narrow lateral width and the flanges of the hubs 21, 22 are thin with both the housing and the hubs having some of the tines working closely on both sides thereof. Of some importance also in this regard is the fact that the tines project laterally beyond the ends of the shaft 19 and the hubs 21, 22 thus assuring that the shaft and the hubs will not interfere with downward progress of the tines.

The cultivator is also particularly effective because the motor is so spaced forwardly of the rotary axis of the earthworking tines as to balance the weight of the cultivator structure to the rear thereof. As a result the center of gravity of the cultivator overlies the rotary axis so that the tines have the full benefit of the weight of the cultivator. At the same time this arrangement eliminates the need of any additional support either by wheels or by the operator, and leaves the operator free to steer the device and control its tilling action by varying the depth of the brake tooth in the ground.

From the foregoing description it will appear obvious that the cultivator is much lighter in weight than its predecessors in the art because of its novel frame construction, light-weight earthworking wheels, and smaller motor, and yet by the maximum use of its weight, the ultilization of the brake tooth, and the lack of interference with the action of the tines, more effective and deeper tillage is accomplished with far less expenditure of horsepower.

If desired, conventional drag-type earthworking implements may be fastened in the hitch 17 instead of the brake tooth 18. In such a case the rotary tined hubs 21, 22 serve as traction wheels, or if desired, these hubs can be replaced by other rotary tractive devices.

It is thought that the invention and the manner of operation will be clear from the foregoing detailed description of the now preferred embodiment. Changes in the details of construction may be resorted to without departing from the spirit of the invention and it is accordingly my intention that no limitations be implied and that the hereto annexed claims be read with the broadest interpretation to which the employed language fairly admits.

Having thus set forth my invention, I claim:

1. An earthworking wheel comprising a hub member providing a radially extending anchoring flange and a plurality of generally U-shaped earthworking units each having one leg thereof secured to an end face of the flange with its free end extending radially therebeyond and with the other leg thereof spaced from the flange in a direction endwise of the hub member, the distance between the free ends of the units being varied so that respective legs of the units do not all travel the same path.

2. An earthworking wheel comprising a hub member, and a circumferential arrangement of generally U-shaped earthworking units secured to the hub member with the free ends of their legs extending beyond the radial extent of the hub member and with the planes defined by the units each being at an angle with a plane normal to the rotary axis of the wheel so that the two legs of each unit will travel different paths, the distance between the free ends of the legs of the units being varied so that the respective legs of the units do not all travel the same path.

3. An earthworking wheel comprising a hub member providing a radially extending anchoring flange and a plurality of generally U-shaped earthworking units each having one leg thereof secured to an end face of the flange with its free end extending radially therebeyond and with the other leg thereof spaced from the flange in a direction endwise of the hub section, the outer ends of some of said secured legs bending over and projecting across the outer peripheral edge of the anchoring flange.

4. An earthworking wheel comprising a hub member providing a radially extending anchoring flange and a plurality of generally U-shaped earthworking units each having one leg thereof secured to an end face of the flange with its free end extending radially therebeyond and with the other leg thereof spaced from the flange in a direction endwise of the hub member, the said other legs and the crossarms between the legs of the U-shaped units being unattached to the hub member.

5. An earthworking wheel comprising a hub, an anchoring flange extending radially from the hub, and a plurality of generally U-shaped earthworking units each having one leg thereof secured to an end face of the anchoring flange with its free end extending radially therebeyond and with the other leg thereof spaced from the flange in a direction endwise of the hub, the crossarms between the legs of the U-shaped units being spaced radially outward from the hub so that the crossarms as well as the legs work the earth.

6. An earthworking wheel comprising a hub, an anchoring flange extending radially from the hub, a plurality of earthworking units each comprised of a bent length of bar stock producing two connected tines one of which tines is secured to an end face of the anchoring flange with its free end extending radially therebeyond and the other of which tines is spaced from the flange in a direction endwise of the hub so that the two tines will travel different paths, each of the earthworking units from one to the other end extremity thereof being substantially completely exposed so that the entire unit will work the earth.

CLAYTON B. MERRY.

References Cited in the file of this patent

UNITED STATES PATENTS

| Number | Name | Date |
|---|---|---|
| 823,240 | Waterman | June 12, 1906 |
| 1,498,378 | Irwin | June 17, 1924 |
| 1,845,936 | Rude | Feb. 16, 1932 |